United States Patent
Chen et al.

(10) Patent No.: US 10,996,989 B2
(45) Date of Patent: May 4, 2021

(54) FLEXIBLE OPTIMIZED DATA HANDLING IN SYSTEMS WITH MULTIPLE MEMORIES

(71) Applicant: INTERNATIONAL BUSINESS MACHINES CORPORATION, Armonk, NY (US)

(72) Inventors: Tong Chen, Yorktown Heights, NY (US); John Kevin O'Brien, South Salem, NY (US); Daniel A. Prener, Croton-on-Hudson, NY (US); Zehra N. Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 15/180,756

(22) Filed: Jun. 13, 2016

(65) Prior Publication Data
US 2017/0357445 A1    Dec. 14, 2017

(51) Int. Cl.
*G06F 9/50* (2006.01)

(52) U.S. Cl.
CPC ............ *G06F 9/5016* (2013.01); *Y02D 10/00* (2018.01)

(58) Field of Classification Search
CPC ...... G06F 3/061; G06F 3/0647; G06F 3/0683; G06F 9/5016; Y02D 10/00
USPC ...................................................... 717/151
See application file for complete search history.

(56) References Cited

U.S. PATENT DOCUMENTS

| | | | |
|---|---|---|---|
| 5,953,531 A * | 9/1999 | Megiddo | G06F 8/443 717/160 |
| 5,954,085 A | 9/1999 | Moore et al. | |
| 7,065,634 B2 | 6/2006 | Lewis et al. | |
| 8,380,703 B2 | 2/2013 | Egan et al. | |

(Continued)

FOREIGN PATENT DOCUMENTS

| CN | 1758221 | 4/2006 |
|---|---|---|
| CN | 1783086 | 6/2006 |

(Continued)

OTHER PUBLICATIONS

Vanderpas, An Overview of OpenMP, Sun Microsystems (2009) retrieved from https://www.openmp.org/wp-content/uploads/ntu-vanderpas.pdf on Jun. 10, 2018.*

(Continued)

*Primary Examiner* — Lewis A Bullock, Jr.
*Assistant Examiner* — Theodore E Hebert
(74) *Attorney, Agent, or Firm* — Tutunjian & Bitetto, P.C.; Vazken Alexanian

(57) ABSTRACT

Methods and systems for optimizing an application for a computing system having multiple distinct memory locations that are interconnected by one or more communication channels include determining one or more data handling properties for a data region in an application. One or more data handling policies for the data region are determined based on the one or more data handling properties. Data setup costs are determined for a scope in the application that uses the data region in different memory locations based on the one or more data handling properties. The application is (Continued)

optimized in accordance with the one or more data handling policies and the data setup costs for the different memory locations.

19 Claims, 7 Drawing Sheets

(56) References Cited

U.S. PATENT DOCUMENTS

| | | | |
|---|---|---|---|
| 8,468,510 B1* | 6/2013 | Sundararajan | G06F 17/5054 711/118 |
| 8,719,501 B2 | 5/2014 | Flynn et al. | |
| 8,893,103 B2* | 11/2014 | Ravi | G06F 8/33 717/151 |
| 9,274,771 B1* | 3/2016 | Kalogeropulos | G06F 8/443 |
| 2002/0091751 A1* | 7/2002 | Sonoda | G06F 3/061 709/201 |
| 2004/0083342 A1* | 4/2004 | Gschwind | G06F 9/52 711/147 |
| 2006/0095705 A1* | 5/2006 | Wichelman | G06F 3/0605 711/171 |
| 2006/0101104 A1* | 5/2006 | Bhanot | G06F 9/5066 708/105 |
| 2007/0174411 A1* | 7/2007 | Brokenshire | G06F 15/17337 709/213 |
| 2008/0263386 A1* | 10/2008 | Darrington | G06F 11/203 714/4.11 |
| 2009/0125883 A1* | 5/2009 | Barsness | G06F 9/5027 717/119 |
| 2009/0271799 A1* | 10/2009 | Barsness | G06F 9/5072 718/106 |
| 2011/0067014 A1* | 3/2011 | Song | G06F 8/456 717/149 |
| 2011/0258627 A1* | 10/2011 | Faraj | G06F 9/546 718/100 |
| 2012/0117535 A1* | 5/2012 | Pointer | G06F 8/456 717/107 |
| 2013/0247034 A1* | 9/2013 | Messerli | G06F 9/45533 718/1 |
| 2014/0130027 A1* | 5/2014 | Chen | G06F 8/41 717/151 |
| 2014/0149970 A1 | 5/2014 | Duchenay et al. | |
| 2014/0281323 A1* | 9/2014 | Duluk, Jr. | G06F 12/1009 711/165 |
| 2014/0372995 A1* | 12/2014 | Mori | G06F 8/452 717/146 |
| 2015/0269073 A1* | 9/2015 | O'Brien | G06F 12/06 711/203 |
| 2015/0334155 A1* | 11/2015 | Bragstad | H04L 47/805 709/219 |
| 2016/0092500 A1 | 3/2016 | Perez et al. | |
| 2016/0357529 A1* | 12/2016 | Tsujimori | G06F 8/452 |
| 2016/0357703 A1* | 12/2016 | Suzuki | G06F 15/17318 |
| 2017/0024924 A1* | 1/2017 | Wald | G06T 1/60 |
| 2017/0357445 A1* | 12/2017 | Chen | G06F 3/061 |

FOREIGN PATENT DOCUMENTS

| | | |
|---|---|---|
| CN | 103207786 | 7/2013 |
| JP | 2006-085208 A | 3/2006 |
| JP | 2008-047156 A | 2/2008 |
| JP | 2011-528142 A | 11/2011 |

OTHER PUBLICATIONS

Cristiana Amza et al., Treadmarks: Shared Memory Computing on Networks of Workstations, Computer, vol. 29, No. 2, pp. 18-28, Feb. 1996.

Sangmin Seo et al., Design and Implementation of Software-Managed Caches for Multicores with Local Memory, Feb. 14-18, 2009 IEEE 15th International Symposium on High Performance Computer Architecture, pp. 55-66, Raleigh, NC.

Ganesh Bikshandi et al., Programming for Parallelism and Locality with Hierarchically Tiled Arrays, Proceedings of the eleventh ACM SIGPLAN symposium on Principles and practice of parallel programming, ACM Mar. 29-31, 2006, pp. 48-57, New York, NY.

Message Passing Interface Forum, http://www.mpi-forum.org, accessed Apr. 20, 2016.

OpenACC Accelerating a Jacobi Iteration; www.openacc.org, accessed Apr. 20, 2016.

OpenMP Specifications, http://openMP.org/wp/openmp-specifications/, accessed Apr. 20, 2016.

Parallel Programming and Computing Platform, http://www.nvidia.com/object/cuda_home_new.html, accessed Apr. 20, 2016.

What is UPC?, https://upc-lang.org/, accessed Apr. 20, 2016.

International Search Report for PCT/IB2017/050953 dated Jun. 15, 2017 (4 pages).

* cited by examiner

FLEXIBLE OPTIMIZED DATA HANDLING IN SYSTEMS WITH MULTIPLE MEMORIES

STATEMENT REGARDING FEDERALLY SPONSORED RESEARCH OR DEVELOPMENT

This invention was made with Government support under Contract No. B604142 awarded by Department of Energy. The Government has certain rights in this invention.

BACKGROUND

Technical Field

The present invention generally relates to data management and, more particularly, to the optimization of memory location and memory access channels.

Description of the Related Art

Modern computing systems may have multiple different memories and storage locations available. This is possible on many scales, including for example multiple memories within a single device, multiple distributed computing systems that each have local memories, cloud computing systems, etc. When executing software that has access to multiple memories, decisions as to where to store particular data and how to communicate said data to the appropriate location are determined either automatically or by hand.

In one conventional approach, low-level programming technologies such as message passing interface (MPI) have the programmer manually determine memory storage locations and communication methods. However, this process is error-prone and difficult to optimize as systems become complex.

Automatic systems are also available, where little programmer input is needed. However, such systems provide generic solutions that may be poorly tuned to the specific application and may have unnecessarily high overheads. Semi-automatic systems control data movement through high-level programmer directives, but this only exploits information on what data regions are read or written at specific points in the application and does not work well for data regions that have fine-grained, irregular accesses. In the worst case, the semi-automatic systems devolve to the low-level approach when using recursive, pointer-based data structures.

SUMMARY

A method for optimizing an application for a computing system having multiple distinct memory locations that are interconnected by one or more communication channels includes determining one or more data handling properties for a data region in an application. One or more data handling policies for the data region are determined based on the one or more data handling properties. Data setup costs are determined for a scope in the application that uses the data region in different memory locations based on the one or more data handling properties. The application is optimized in accordance with the one or more data handling policies and the data setup costs for the different memory locations.

A method for optimizing an application for a computing system having multiple distinct memory locations that are interconnected by one or more communication channels includes determining one or more data handling properties for a data region in an application. One or more data handling policies are determined for the data region based on the one or more data handling properties. Data setup costs are determined for a scope in the application that uses the data region in different memory locations based on the one or more data handling properties. The application is optimized in accordance with the one or more data handling policies and the data setup costs for the different memory locations. Optimizing includes selecting one or more memory locations in which to store the data region and selecting one or more communication channels by which the data region is transferred between memory locations.

A system for optimizing an application for computing a system having multiple distinct memory locations that are interconnected by one or more communication channels includes a compiler module that has a processor configured to determine one or more data handling properties for a data region in an application, to determine one or more data handling policies for the data region based on the one or more data handling properties, to determine data setup costs for a scope in the application that uses the data region in different memory locations based on the one or more data handling properties, and to optimizing the application in accordance with the one or more data handling policies and the data setup costs for the different memory locations.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention automate control of data movement using hints from the programmer that are centered on program data. These hints specify properties about the data that substantially aid in subsequent automated optimization and lead to specific policies for data handling.

It is to be understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
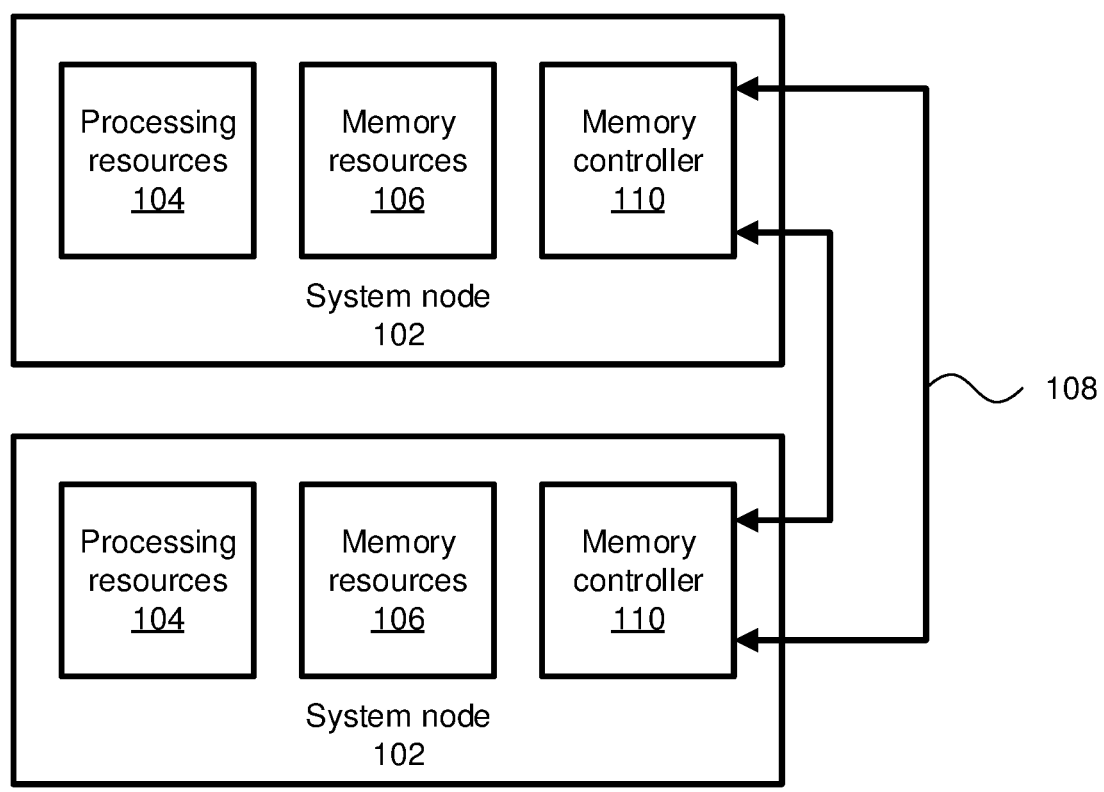
FIG. 1 is a block diagram of a computing system having multiple memories in accordance with the present principles.

Referring now to FIG. 1, a generalized computing system 100 is shown with multiple memories. The computing system 100 includes multiple system nodes 102, each with respective processing resources 104 and memory resources 106. It should be understood that the processing resources 104 may include one or more hardware processors and that the memory resources 106 may include one or more banks of storage of any suitable type, as discussed in greater detail below.

The system nodes 102 communicate with one another over one of several communications channels 108. The communications channels 108 may be any appropriate form of data communication system including, e.g., an in-system bus, a wired connection, a wireless connection, a connection through the internet, etc. Each system node 102 includes one or more memory controllers 110 that receive requests for data, retrieve the requested data from memory resources 106, and communicate the requested data to the requesting node via one or more communications channels 108. The memory controllers 110 also handle replication of data to other nodes 102 to, e.g., increase system performance by creating local copies at nodes 102 that will need them.

It should be noted that the communication channels 108 include both hardware and software aspects. Hardware mechanisms refer to the physically available communication paths which may be directly exposed using, for example, an application programming interface (API) call by the software. Two memories may have multiple physical connections between them in the form of direct physical interconnects, but there may also be indirect physical connections through, e.g., the data flow from a first memory resource 106, through processing resource 104, to a second memory resource. Software communication mechanisms may be built on top of the hardware mechanisms and may provide additional services or enforce some policy. The hardware mechanisms and the software mechanisms together make up the communication channels 108.

How the memory controllers 110 determine where data is stored and how to communicate data to requesting nodes is determined by a software program running on the processing resources 104. Each software program will have different needs for data management and therefore will have different optimal data handling policies that correspond to the specific types of data that are being used.

To accommodate these different possibilities, the software program is optimized at compile-time and at runtime in accordance with known properties of the data at issue. Data handling policies are determined at compile-time, but the code may further be compiled with runtime calls that help facilitate the implementation of the policies. Runtime calls may include application programming interface (API) calls for the software communication mechanisms or they may be calls to query the state of runtime system resources or program data to facilitate the choosing of an execution path.

The data properties may be set explicitly by the programmer or they may be discovered automatically. Data properties that may be used include the size of a data region for data in a given scope, read/write/read-write access status, coverage information, access frequency information, and data layout information. In particular, coverage information refers to how many elements of a data region are accessed (e.g., few, all, most, or some fixed or variable percentage of the data region size), access frequency information refers to how often the data region is accessed (e.g., once, rarely, at regular intervals, in bursts, etc.), and data layout information refers to whether accesses are, e.g., streaming, random, or strided. Other criteria that may be considered during optimization are the time it takes to transfer data, the amount and frequency of data to be transferred, the overhead of copying data, the cost of maintaining coherence and consistency, power and bandwidth constraints for the system 100, and computation-to-communication ratio and overlap.

In one specific embodiment, the system 100 is implemented as a cloud computing system, with many different nodes 102 that may be geographically quite far from one another. In such systems, the cost of transferring data from one node 102 to another across communication channels 108 may be quite high relative to the cost of performing the associated computations on that data. In such a case, the utility of optimizing data storage and communication channels is clear.

Figure 2:
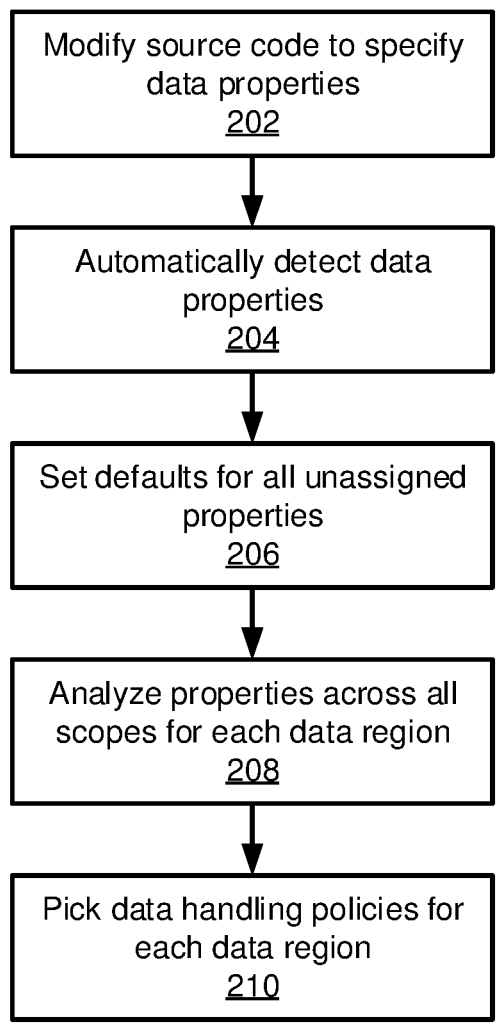
FIG. 2 is a block/flow diagram of a method for selecting data handling policies based on data properties in accordance with the present principles.

Referring now to FIG. 2, a method of selecting policies based on data properties is shown. Block 202 modifies the source code of an application that is intended to run on the system 100 to specify data properties for data regions. It is specifically contemplated that block 202 may be performed manually by the programmer and includes the entry of explicit instructions that specify, for example, one of the properties described above. Block 204 then automatically detects properties for the data regions of the application using, for example, static analysis and dynamic profiling, to fill in as many gaps in the property definitions as possible. For any data regions that have properties that remain unassigned, block 206 sets default values.

Block 208 analyzes the properties for each data region across all scopes of the application. As used herein, the term "scope" refers to a section of the application code, which may be demarcated based on syntactic structures in the code or based on the sequence of instructions to be executed. The analysis will depend on the specific configuration of the system 100 and the needs of the application, but some examples are set forth below. In general, block 208 attempts to optimize one or more system metrics (for example, the speed of the application, power/energy efficiency, or bandwidth utilization) by determining where to store data regions and what communications channels (both hardware and software mechanisms) to use to transfer those data regions. This analysis may consider both hardware and software limitations in view of the application's needs. Based on the analysis, block 210 selects data handling properties, including setting initial data placement, for each data region.

Any of several different data handling policies may apply to a given data region in a given scope in the software program. In general, the policies may be simple (e.g., a selection between two different communication channels) or may be more complex (e.g., select X if the data is located at A, or select Y otherwise).

A first exemplary policy is a choice between different coherence/consistency options. By way of example, a system configuration may include three distinct memory locations, A, B, and C, with coherence supported efficiently in hardware across A and B, but not in C. Coherence for C is handled in software with a high overhead. The application code for an exemplary piece of software relies on system-level coherence and has three scopes, X, Y, and Z, that may be executed in parallel, all of which access the same data region. This data region is copied into the local memories A, B, and C before computation. Then, if X, Y, and Z all write to all elements of the data region, then (X,Y,Z) may be mapped to execute on (A,B,C) in any order, with no software coherence enabled on C. However, if X may not write to all of the elements of the data region, then mapping X to C would necessitate software coherence handling at high cost. In this example, selection of a policy would consider these properties to calculate costs and pick computing locations to prevent X from being mapped to C. This policy thereby selects between a communication channel 108 that supports coherence and one that does not.

A second exemplary policy is a choice between different software-enabled communication mechanisms (e.g., a selection of software communication channels 108). An exemplary system may have a host processor and memory as well as a separate accelerator processor and memory, where the interconnect between the two memories is bandwidth constrained, taking a fixed time to transfer a small amount of data but a longer amount of time to transfer amounts larger than some threshold. Two exemplary software libraries implement data transfers—one that eagerly pushes data (bulk transfers) and another that lazily pulls data (multiple fine-grained transfers). In one exemplary application, the software makes accesses to random elements of a large data region. If there are few elements accessed, then the time latency of multiple small transfers may be less than the time needed to transfer the entire data region. In this example, selection of a policy would consider the access frequency properties to weigh the costs and the benefits of the different policies. The eager and lazy versions of the software library represent different software mechanisms that characterize distinct communication channels 108.

A third exemplary policy is a choice between different hardware-enabled mechanisms (e.g., a selection of hardware mechanisms). As above, the exemplary system has a host processor and memory and an accelerator processor and memory, where the hardware interconnect allows the accelerator to directly access both host memory and accelerator memory (in other words, the accelerator supports load/store instructions using addresses that map to the host memory as well as addresses that map to the accelerator memory). In this case, data that is rarely accessed on the accelerator need not be copied over to its local memory, whereas data that is frequently accessed should still be copied over to improve performance. Selection of a policy would therefore consider properties defining how frequently the data is to be accessed. In this example, directly accessing the host memory and copying the data to local memory represent different communication channels 108.

A fourth exemplary policy is to push data to a next location if data is written exactly once in a scope. An exemplary system may include a host processor and memory as well as a separate accelerator processor and memory, where the interconnect between the two memories has a high transfer latency. There may in addition be two exemplary software libraries available to this exemplary system that may be used to implement data transfers—a first library eagerly pushes data to other locations after a write access by copying the data and a second library lazily pulls data from the location where the data was last updated on a read access. If the software writes exactly once to elements in a data region on the host and then reads multiple times on the accelerator, then it is more efficient to use the eager push library for transferring elements of the data region across the interconnect, because the relatively high write cost will be outweighed by read savings. The eager and lazy versions of the software library represent different software mechanisms that characterize distinct communication channels 108.

A fifth exemplary policy guides placement of data and computations to avoid remote accesses over communications channels 108. The data properties determined per data region can be used to automatically apply data affinity optimizations (e.g., placing data close to the compute location where it will be accessed). An exemplary application may have a large data region that is accessed in a parallel code section. If the data will be accessed in a regular pattern (e.g., streaming or strided data), the data region can be partitioned and placed in multiple memories. Then the compute locations for the parallel code sections can be selected such that they are physically close to the memory that holds the data region partition corresponding to the data accessed by the code. This can help reduce or eliminate data transfers across the communication channels 108.

Figure 3:
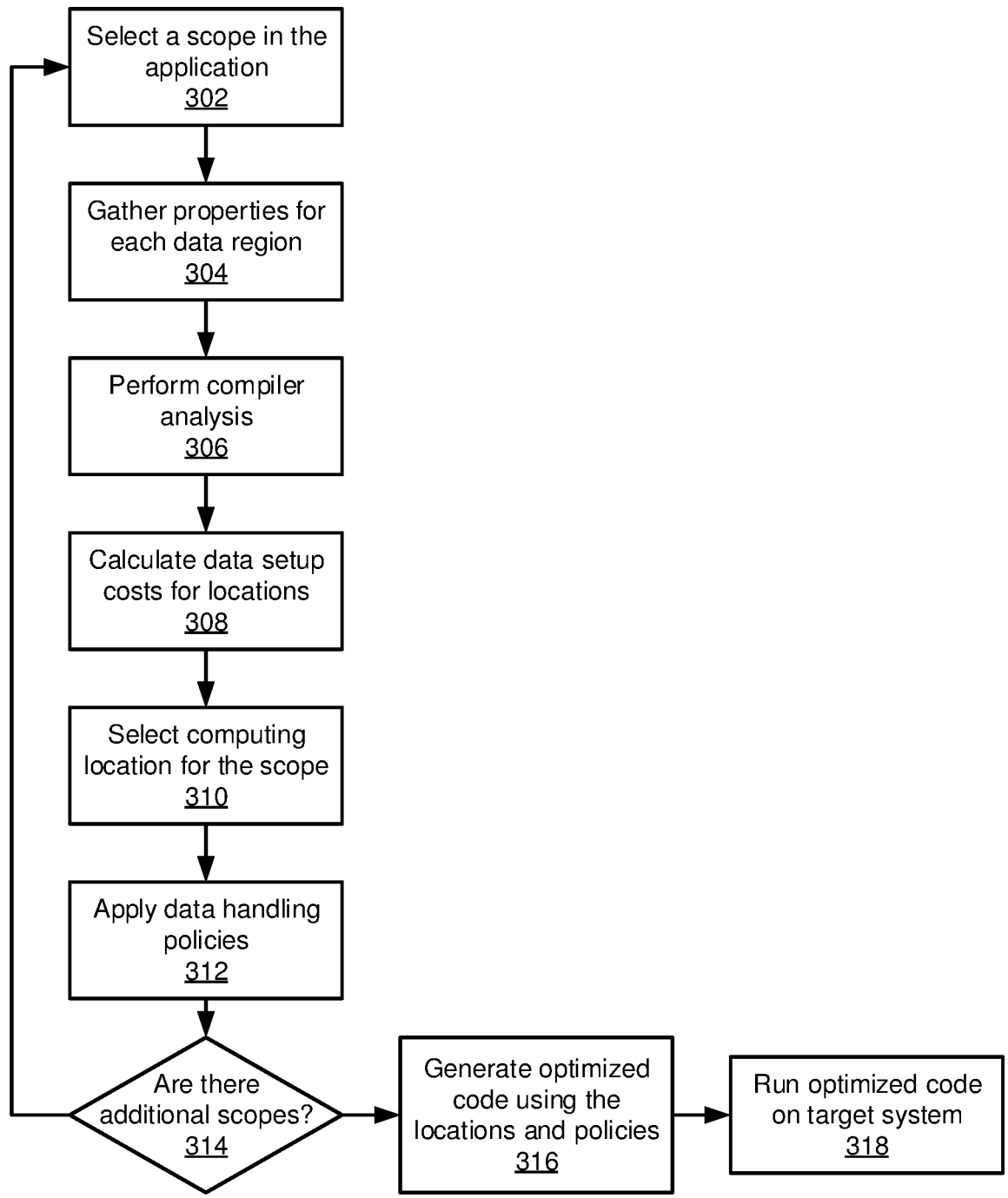
FIG. 3 is a block/flow diagram of a method for optimizing application code based on data properties and data handling policies in accordance with the present principles.

Referring now to FIG. 3, a method of optimizing an application's code is shown. Block 302 selects a new scope from among the different scopes in the application. Block 304 gathers properties for each data region accessed in the scope. Block 304 may re-use the same data properties determined by the process of FIG. 2. Block 306 then performs compiler analysis, augmented by this information. Compiler analysis may include, for example, analyses such as control and data flow analysis, alias analysis, and dependence analysis, that help determine the set of data elements accessed in the code and the access patterns.

Block 308 calculates data setup costs for each of the different computing locations available at the system 100. For each location, information about the set of data elements accessed in the code, the access patterns, and the data handling policies is used to determine the number, size, and direction of data transfers that will be needed if the scope is executed at that computing location. Then, the cost of all of the data transfers can be estimated for the communication channel(s) 108 selected by the data handling policies. An applicable cost metric can include any subset of the system parameters being optimized for including, e.g., execution time, power/energy efficiency, and/or bandwidth usage.

Block 310 selects a computing location for the scope based on the calculated costs. The computing location is selected according to one or more needs in the application. For example, some computing locations may lack features that the application needs, or may have a higher cost associated with those features, such that a different computing location may be selected. In another example, the cost may characterize the power consumption of processing, with processing in some locations incurring a higher power cost. Block 312 then applies the data handling policies to the scope at the relevant computing location(s). For each data region in the scope, the communication channel 108 is selected based on the data handling policy for the data region and the communication channels 108 available for that location. The selected communication channel 108 is used for all data transfers in the scope that correspond to elements of that data region.

Block 314 determines whether there are any additional scopes in the application that have not been handled yet. If so, processing returns to block 302 where a new scope is selected. If not, block 316 generates optimized code using the selected computing location(s) and the data handling policies. This optimized code takes into account the needs of the application across scopes and in a manner that is closely based on the properties of the data regions involved, without necessitating explicit placement by the programmer. As a result, when the code is executed in block 318, the application runs with better performance.

The optimization criteria that are used to determine the best memory locations for data regions will depend on the specific application and system parameters being used. Optimization criteria (i.e., goals to be achieved by the optimization process) may include, for example, improvements in data transfer time, amount/frequency of data being transferred, overhead of data copying, or cost of maintaining coherence/consistency or meeting power/bandwidth constraints in the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
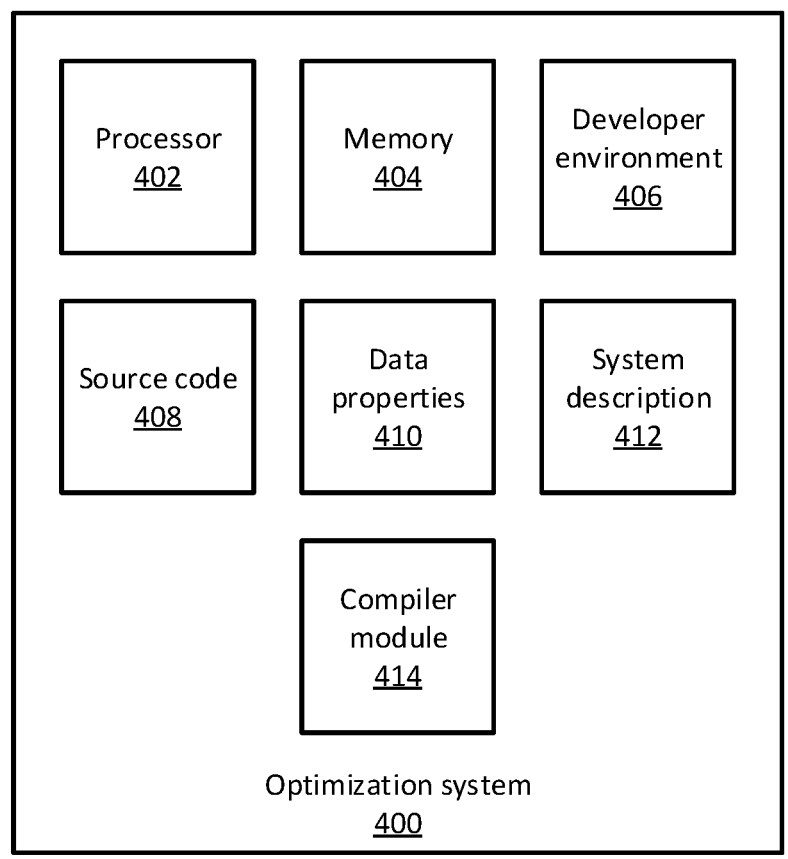
FIG. 4 is a block diagram of an optimization system in accordance with the present principles.

Referring now to FIG. 4, an optimization system 400 is shown. The system 400 includes a hardware processor 402 and memory 404. The system 400 may further include one or more functional modules. The functional modules may be implemented as software that is stored in the memory 404 and executed by the hardware processor 402. In alternative embodiments, the functional modules may be implemented as one or more discrete hardware components in the form of, e.g., application specific integrated chips or field programmable gate arrays.

A developer environment 406 runs on the system 400 and allows a programmer to make changes to source code 408, which is stored in the memory 404. The developer environment 406 provides the ability to manually specify properties 410 for data regions across various scopes of the source code 408. A compiler module 414 uses the data properties and system description 412 to select data handling policies to apply to the source code and selects computing locations for each data region. The compiler module 414 then outputs a compiled application for execution on a system 100 having multiple computing and memory locations.

Figure 5:
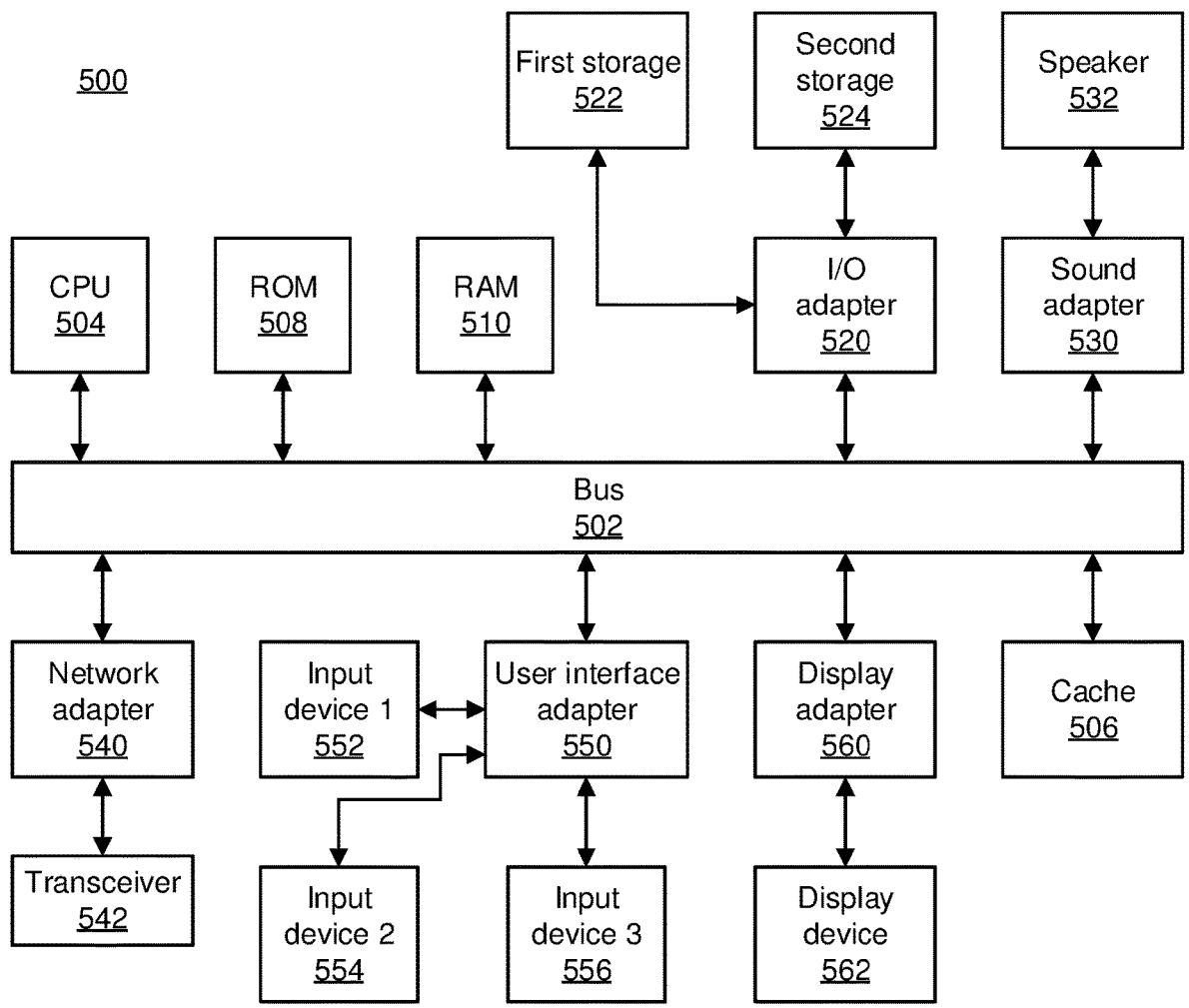
FIG. 5 is a block diagram of a processing system in accordance with the present principles.

Referring now to FIG. 5, an exemplary processing system 500 is shown which may represent the optimizing system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Figure 6:
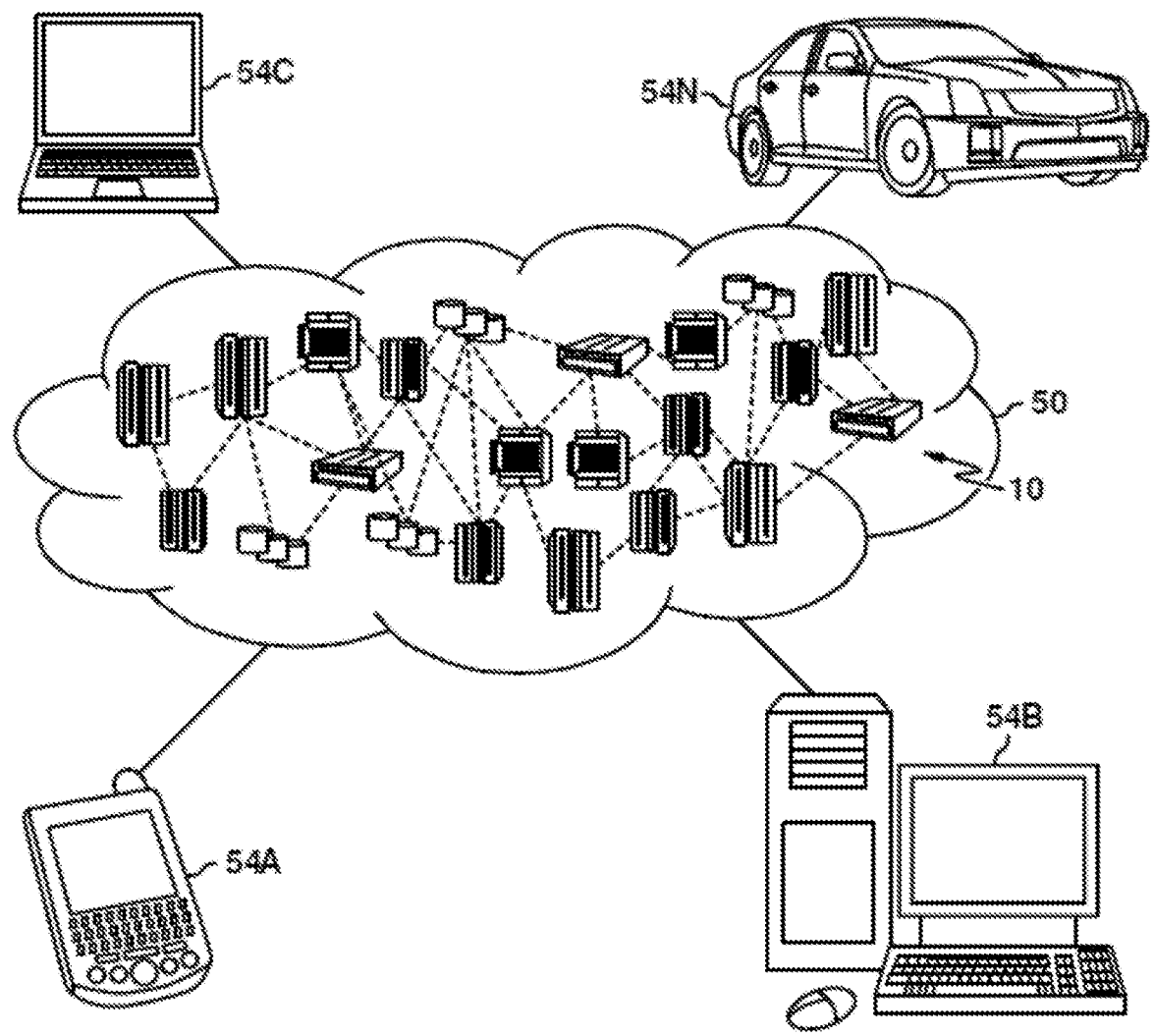
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
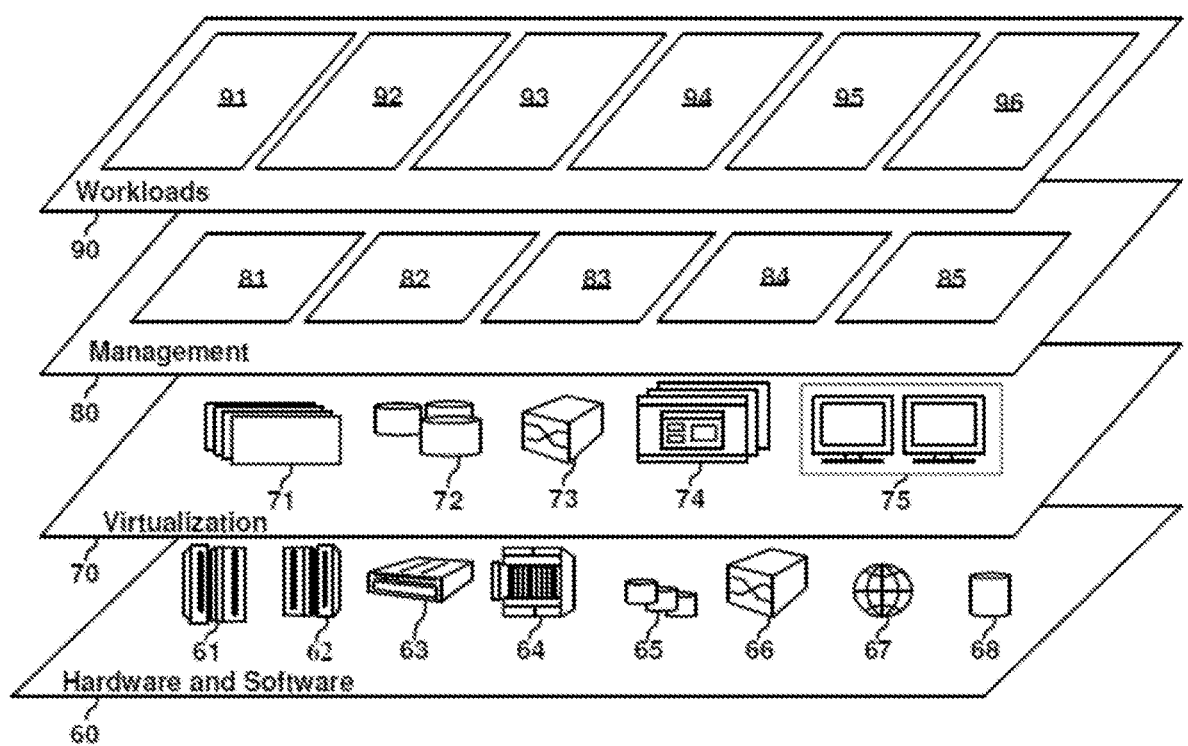
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source code optimization 96.

Having described preferred embodiments of flexible optimized data handling in systems with multiple memories (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for optimizing an application for a computing system having multiple distinct memory locations that are interconnected by one or more communication channels, comprising:
    selecting a scope from a plurality of scopes in the application, each scope of the plurality of scopes being defined by a section of application code demarcated by syntactic structures in the application code;
    determining one or more data handling properties of a data region accessed in a selected scope, the one or more data handling policies including at least pushing data to a next location if the data is written exactly once in the selected scope, data transfers implemented by two software libraries, a first library pushing the data to other locations after a write access by copying the data and a second library pulling the data from the location where the data was last updated on a read access;
    determining, at compile time, one or more data handling policies for the data region based on the one or more data handling properties;
    determining data setup costs for a plurality of scopes in the application, the plurality of scopes using the data region in different memory locations based on the one or more data handling properties; and
    optimizing the application in accordance with the one or more data handling policies and the data setup costs for the different memory locations.

2. The method of claim 1, wherein optimizing the application comprises selecting one or memory locations in which to store the data region.

3. The method of claim 1, further comprising selecting one or more communications channels by which the data region is transferred between memory locations.

4. The method of claim 1, wherein the one or more data handling properties of the data region comprise coverage information.

5. The method of claim 1, wherein the one or more data handling properties of the data region comprise access frequency information.

6. The method of claim 1, wherein the one or more data handling properties of the data region comprise data layout information.

7. The method of claim 1, wherein at least one of the one or more data handling properties is set by a programmer.

8. The method of claim 1, further comprising applying the one or more data handling policies to the scope at a computing location.

9. The method of claim 1, wherein the one or more data handling policies include at least one of coherence option selection, software-enabled communication mechanism selection, and hardware mechanism selection.

10. A non-transitory computer readable storage medium comprising a computer readable program for optimizing an application for a computing system having multiple distinct memory locations that are interconnected by one or more communication channels, wherein the computer readable program when executed on a computer causes the computer to perform the steps of:
    selecting a scope from a plurality of scopes in the application, each scope of the plurality of scopes being defined by a section of application code demarcated by syntactic structures in the application code;
    determining one or more data handling properties of a data region accessed in a selected scope, the one or more data handling policies including at least pushing data to a next location if the data is written exactly once in the selected scope, data transfers implemented by two software libraries, a first library pushing the data to other locations after a write access by copying the data and a second library pulling the data from the location where the data was last updated on a read access;
    determining, at compile time, one or more data handling policies for the data region in the scope based on the one or more data handling properties;
    determining data setup costs for a plurality of scopes in the application, the plurality of scopes using the data region in different memory locations based on the one or more data handling properties; and
    optimizing the application in accordance with the one or more data handling policies and the data setup costs for the different memory locations.

11. A system for optimizing an application for computing a system having multiple distinct memory locations that are interconnected by one or more communication channels, comprising:
    a compiler module comprising a processor configured to:

select a scope from a plurality of scopes in the application, each scope of the plurality of scopes being defined by a section of application code demarcated by syntactic structures in the application code, determine one or more data handling properties of a data region accessed in a selected scope, the one or more data handling policies including at least pushing data to a next location if the data is written exactly once in the selected scope, data transfers implemented by two software libraries, a first library pushing the data to other locations after a write access by copying the data and a second library pulling the data from the location where the data was last updated on a read access, determine one or more data handling policies for the data region in the scope based on the one or more data handling properties, determine, at compile time, data setup costs for a plurality of scopes in the application, the plurality of scopes using the data region in different memory locations based on the one or more data handling properties, and optimize the application in accordance with the one or more data handling policies and the data setup costs for the different memory locations.

12. The system for optimizing of claim 11, wherein the compiler module is further configured to select one or memory locations in which to store the data region.

13. The system for optimizing of claim 11, wherein the compiler module is further configured to select one or more communications channels by which the data region is transferred between memory locations.

14. The system for optimizing of claim 11, wherein the one or more data handling properties of the data region comprise coverage information.

15. The system for optimizing of claim 11, wherein the one or more data handling properties of the data region comprise access frequency information.

16. The system for optimizing of claim 11, wherein the one or more data handling properties of the data region comprise data layout information.

17. The system for optimizing of claim 11, wherein at least one of the one or more data handling properties is set by a programmer.

18. The system for optimizing of claim 11, wherein each scope in the application is defined by a section of application code demarcated by syntactic structures in the application code or by a sequence of instructions to be executed.

19. The system for optimizing of claim 11, wherein the one or more data handling policies include at least one of coherence option selection, software-enabled communication mechanism selection, and hardware mechanism selection.

* * * * *